(12) United States Patent
Yakushiji et al.

(10) Patent No.: US 12,095,071 B2
(45) Date of Patent: Sep. 17, 2024

(54) ELECTRODE MANUFACTURING SYSTEM AND ELECTRODE MANUFACTURING METHOD

(71) Applicant: MUSASHI ENERGY SOLUTIONS CO., LTD., Hokuto (JP)

(72) Inventors: Hiroki Yakushiji, Minato-ku (JP); Masaya Naoi, Minato-ku (JP); Kenji Kojima, Minato-ku (JP)

(73) Assignee: MUSASHI ENERGY SOLUTIONS CO., LTD., Hokuto (JP)

( * ) Notice: Subject to any disclaimer, the term of this patent is extended or adjusted under 35 U.S.C. 154(b) by 556 days.

(21) Appl. No.: 17/424,647

(22) PCT Filed: Nov. 27, 2019

(86) PCT No.: PCT/JP2019/046403
§ 371 (c)(1),
(2) Date: Jul. 21, 2021

(87) PCT Pub. No.: WO2020/152980
PCT Pub. Date: Jul. 30, 2020

(65) Prior Publication Data
US 2022/0085350 A1 Mar. 17, 2022

(30) Foreign Application Priority Data
Jan. 23, 2019 (JP) ................................. 2019-009584

(51) Int. Cl.
*H01M 4/04* (2006.01)
*H01G 11/86* (2013.01)

(52) U.S. Cl.
CPC .......... *H01M 4/0459* (2013.01); *H01G 11/86* (2013.01)

(58) Field of Classification Search
CPC .................................................. H01M 4/0459
See application file for complete search history.

(56) References Cited

U.S. PATENT DOCUMENTS

2015/0311527 A1* 10/2015 Khot ................... H01M 10/052
429/188
2018/0374661 A1 12/2018 Endou et al.
(Continued)

FOREIGN PATENT DOCUMENTS

| CN | 108701553 A | 10/2018 |
| JP | 10-308212 A | 11/1998 |

(Continued)

OTHER PUBLICATIONS

Combined Chinese Office Action and Search Report issued Jun. 11, 2023 in Chinese Patent Application No. 201980089666.X (with unedited computer-generated English translation), 16 pages.

(Continued)

*Primary Examiner* — Olatunji A Godo
(74) *Attorney, Agent, or Firm* — Oblon, McClelland, Maier & Neustadt, L.L.P.

(57) ABSTRACT

The electrode manufacturing system comprises a cutting device. The cutting device cuts an electrode material along one direction of the electrode material to manufacture electrodes. The electrode material comprises first sections and a second section. The first section includes an active material doped with alkali metal, and extends in the one direction. The second section is located between two adjacent first sections of the first sections. In the second section, the active material doped with alkali metal is absent. The cutting device cuts the second section.

8 Claims, 11 Drawing Sheets

(56) References Cited

U.S. PATENT DOCUMENTS

2019/0074143 A1 3/2019 Naoi et al.
2019/0341598 A1* 11/2019 Nam ..................... H01M 4/525

FOREIGN PATENT DOCUMENTS

| | | |
|---|---|---|
| JP | 2005-123175 A | 5/2005 |
| JP | 2006-107795 A | 4/2006 |
| JP | 2008-77963 A | 4/2008 |
| JP | 2009-246137 A | 10/2009 |
| JP | 2012-49543 A | 3/2012 |
| JP | 2012-49544 A | 3/2012 |
| JP | 2013-254595 A | 12/2013 |
| JP | 2013-258392 A | 12/2013 |
| KR | 10-2015-0025686 A | 3/2015 |

OTHER PUBLICATIONS

Office Action issued Feb. 3, 2024, in corresponding Chinese Patent Application No. 201980089666.X (with English Translation), 11 pages.
Extended European Search Report issued Sep. 8, 2022, in corresponding European Patent Application No. 19911081.8, 9 pages.

* cited by examiner

ELECTRODE MANUFACTURING SYSTEM AND ELECTRODE MANUFACTURING METHOD

CROSS-REFERENCE TO RELATED APPLICATION

This international application claims the benefit of Japanese Patent Application No. 2019-009584 filed on Jan. 23, 2019 with the Japan Patent Office, and the entire disclosure of Japanese Patent Application No. 2019-009584 is incorporated herein by reference.

TECHNICAL FIELD

The present disclosure relates to an electrode manufacturing system and an electrode manufacturing method.

BACKGROUND ART

In recent years, reduction in size and weight of electronic devices has been remarkable, and thus, there has been an increased demand for reduction in size and weight of batteries to be used as power supplies for driving such electronic devices.

In order to meet the demand for reduction in size and weight, non-aqueous electrolyte rechargeable batteries, as typified by lithium-ion rechargeable battery, have been developed. Also, lithium ion capacitors are known as power storage devices available for uses requiring high energy density characteristics and high output characteristics. Further known are sodium ion batteries and capacitors using sodium which is lower in cost and more abundant as a natural resource than lithium.

For these batteries and capacitors, a process of previously doping an electrode with alkali metal (generally referred to as pre-doping) is adopted for various purposes. Methods for pre-doping an electrode with alkali metal include, for example, a continuous method. In the continuous method, pre-doping is performed while transferring a strip-shaped electrode plate in an electrolyte solution. The continuous method is disclosed in Patent Documents 1 to 4.

PRIOR ART DOCUMENTS

Patent Documents

Patent Document 1: Japanese Unexamined Patent Application Publication No. H10-308212
Patent Document 2: Japanese Unexamined Patent Application Publication No. 2008-77963
Patent Document 3: Japanese Unexamined Patent Application Publication No. 2012-49543
Patent Document 4: Japanese Unexamined Patent Application Publication No. 2012-49544

SUMMARY OF THE INVENTION

Problems to be Solved by the Invention

There has been a growing demand for manufacturing electrodes more efficiently. In one aspect of the present disclosure, it is desirable to provide an electrode manufacturing system and an electrode manufacturing method capable of manufacturing electrodes efficiently.

Means for Solving the Problems

One aspect of the present disclosure provides an electrode manufacturing system comprising a cutting device configured to cut an electrode material along one direction of the electrode material to manufacture electrodes, wherein the electrode material comprises first sections including an active material doped with alkali metal, the first sections extending in the one direction, and a second section in which the active material doped with alkali metal is absent, the second section arranged between two adjacent first sections of the first sections, and wherein the cutting device is configured to cut the second section.

The electrode manufacturing system as one aspect of the present disclosure is capable of manufacturing two or more electrodes from a single electrode material. Thus, in the electrode manufacturing system as one aspect of the present disclosure, it is possible to efficiently manufacture electrodes.

Another aspect of the present disclosure provides an electrode manufacturing method comprising cutting an electrode material along one direction to manufacture electrodes, wherein the electrode material comprises first sections including an active material doped with alkali metal, the first sections extending in the one direction, and a second section in which the active material doped with alkali metal is absent, the second section arranged between two adjacent first sections of the first sections, and wherein cutting the electrode material along one direction of the electrode material to manufacture electrodes comprises cutting the second section.

In the electrode manufacturing method as another aspect of the present disclosure, two or more electrodes can be manufactured from a single electrode material. Thus, in the electrode manufacturing method as one aspect of the present disclosure, it is possible to efficiently manufacture electrodes.

EXPLANATION OF REFERENCE NUMERALS

1 . . . electrode material, 3 . . . current collector, 5 . . . active material layer, 5A . . . doped portion, 5B . . . non-doped portion, 7 . . . exposed portion, 11 . . . electrode material manufacturing apparatus, 13 . . . cutting device, 15 . . . immersing tank, 17, 19, 21 . . . doping tank, 23 . . . cleaning tank, 25, 27, 29, 31, 33, 35, 37, 39, 40, 41, 43, 45, 46, 47, 49, 51, 52, 53, 55, 57, 58, 59, 61, 63, 64, 65, 67, 69,

70, 71, 73, 75, 77, 79, 81, 83, 85, 87, 89, 91, 93 . . . conveyor roller, 101 . . . supply roll, 103 . . . winding roll, 105 . . . support, 107 . . . circulation filtration unit, 109, 110, 111, 112, 113, 114 . . . power supply, 117 . . . tab cleaner, 119 . . . solution collecting unit, 121 . . . end portion sensor, 131 . . . upstream tank, 133 . . . downstream tank, 137, 139, 141, 143 . . . counter electrode member, 144 . . . mask, 149, 151 . . . space, 153 . . . conductive base material, 155 . . . alkali metal-containing plate, 157 . . . porous insulation member, 161 . . . filter, 162 . . . supply roll, 163 . . . pump, 164 . . . conveyor roller, 165 . . . pipe, 166 . . . conveyor roller, 169 . . . slitter, 171, 173, 175, 177 . . . winding roll, 179 . . . body shaft, 181 . . . circular blade, 183 . . . cut end, 185, 186 . . . electrode, 187 . . . first remaining part, 189 . . . second remaining part

MODE FOR CARRYING OUT THE INVENTION

Example embodiments of the present disclosure will be described with reference to the drawings.

First Embodiment

1. Configuration of Electrode Material 1

Figure 1:
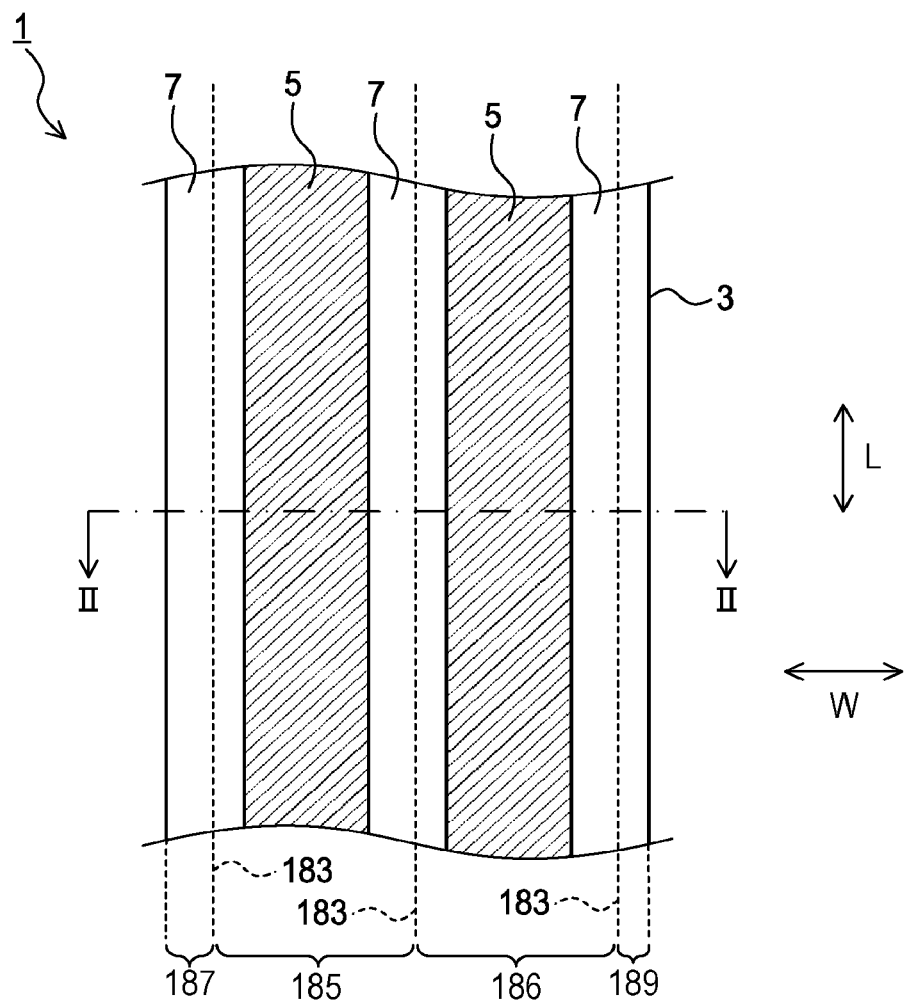
FIG. 1 is a plan view showing a configuration of an electrode material.
Figure 2:
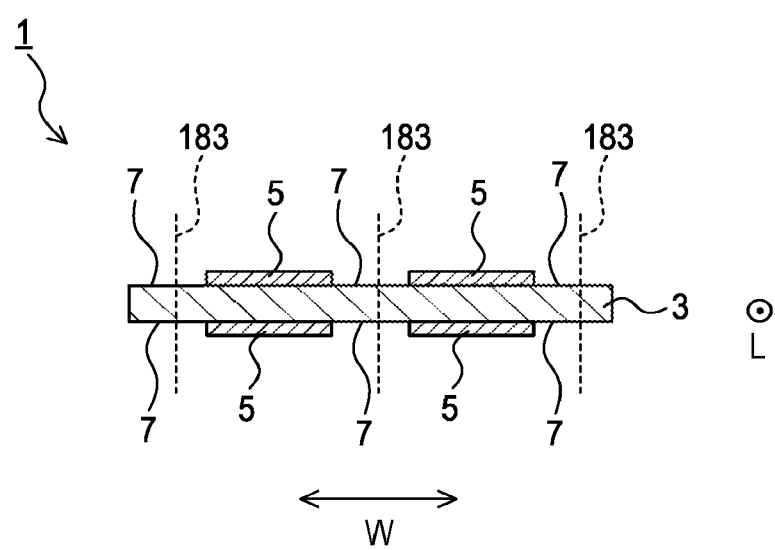
FIG. 2 is a sectional view taken along section of FIG. 1.

A configuration of an electrode material 1 will be described with reference to FIG. 1 and FIG. 2. The electrode material 1 is used for manufacturing electrodes. The electrode material 1 has a strip shape. The electrode material 1 comprises a current collector 3 and an active material layer 5. The current collector 3 has a strip-shape. The active material layers 5 are formed on both surfaces of the current collector 3. In a width direction W of the electrode material 1, the active material layer 5 has a width smaller than that of the current collector 3. The active material layer 5 extends along a longitudinal direction L of the electrode material 1. The active material layer 5 corresponds to a first section. The longitudinal direction L corresponds to one direction of the electrode material 1.

A portion in which the current collector 3 is exposed (hereinafter, referred to as an exposed portion 7) is formed between two active material layers 5 adjacent to each other in the width direction W. The exposed portion 7 is also formed at each end of the electrode material 1 in the width direction W. The exposed portion 7 extends along the longitudinal direction L of the electrode material 1. In the exposed portion 7, an active material is absent. The exposed portion 7 corresponds to a second section.

The current collector 3 may be preferably a metal foil, such as copper, nickel, and stainless steel. In addition, the current collector 3 may have a conductive layer, including a carbon material as a main component, formed on the metal foil. The thickness of the current collector 3 may be, for example, 5 to 50 μm.

The active material layer 5 may be formed, for example, by applying slurry including an active material before pre-doped with alkali metal (hereinafter, referred to as a non-doped state) and a binder on the current collector 3, and drying the slurry.

Examples of the binder may include rubber-based binders, such as styrene-butadiene rubber (SBR) and NBR; fluorine resins, such as polytetrafluoroethylene and polyvinylidene fluoride; polypropylene, polyethylene, and fluorine modified (meth) acrylic binder as disclosed in Japanese Unexamined Patent Application Publication No. 2009-246137.

The slurry may include other components in addition to the active material and the binder. Examples of such other components may include conductive agents, such as carbon black, graphite, vapor-grown carbon fiber, and metal powder; and thickeners, such as carboxyl methyl cellulose, a Na salt or ammonium salt thereof, methyl cellulose, hydroxymethyl cellulose, ethyl cellulose, hydroxypropyl cellulose, polyvinyl alcohol, oxidized starch, phophorylated starch, and casein.

A thickness of the active material layer 5 is not particularly limited. The thickness of the active material layer 5 may be, for example, 5 to 500 μm, preferably 10 to 200 μm, particularly preferably 10 to 100 μm. The active material included in the active material layer 5 is not particularly limited, as long as the material is an electrode active material applicable to batteries or capacitors utilizing reactions such as insertion/desorption of alkali metal ions. The active material may be a negative electrode active material or a positive electrode active material.

The negative electrode active material is not particularly limited. Examples of the negative electrode active material may include carbon material, such as graphite, easily-graphitizable carbon, hardly-graphitizable carbon, and a composite carbon material obtained by coating graphite particles with a pitch or a resin carbide; and a material comprising a metal or semi-metal, such as Si and Sn, that can be alloyed with lithium, or an oxide thereof. Examples of the carbon material may include a carbon material described in Japanese Unexamined Patent Application Publication No. 2013-258392. Examples of the material comprising the metal or semi-metal that can be alloyed with lithium or the oxide thereof may include the materials described in Japanese Unexamined Patent Application Publication No. 2005-123175 and Japanese Unexamined Patent Application Publication No. 2006-107795.

Examples of the positive electrode active material may include transition metal oxides, such as cobalt oxide, nickel oxide, manganese oxide, vanadium oxide; and sulfur-based active materials, such as simple sulfur substance and metal sulfide. Any of the positive electrode active material and the negative electrode active material may be made of a single substance or a mixture of two or more types of substances.

The active material included in the active material layer 5 is pre-doped with alkali metal using an electrode material manufacturing apparatus 11 described later. The alkali metal to be pre-doped to the active material is preferably lithium or sodium, particularly preferably lithium. In the case of using the electrode material 1 for manufacturing electrodes of lithium-ion rechargeable batteries, a density of the active material layer 5 is preferably 1.30 to 2.00 g/cc, and particularly preferably 1.40 to 1.90 g/cc.

2. Configuration of Electrode Material Manufacturing Apparatus 11 of Electrode Manufacturing System An electrode manufacturing system of the present disclosure comprises an electrode material manufacturing apparatus 11 and a cutting device 13. A configuration of the electrode material manufacturing apparatus 11 will be described with reference to FIG. 3 to FIG. 6.

Figure 3:
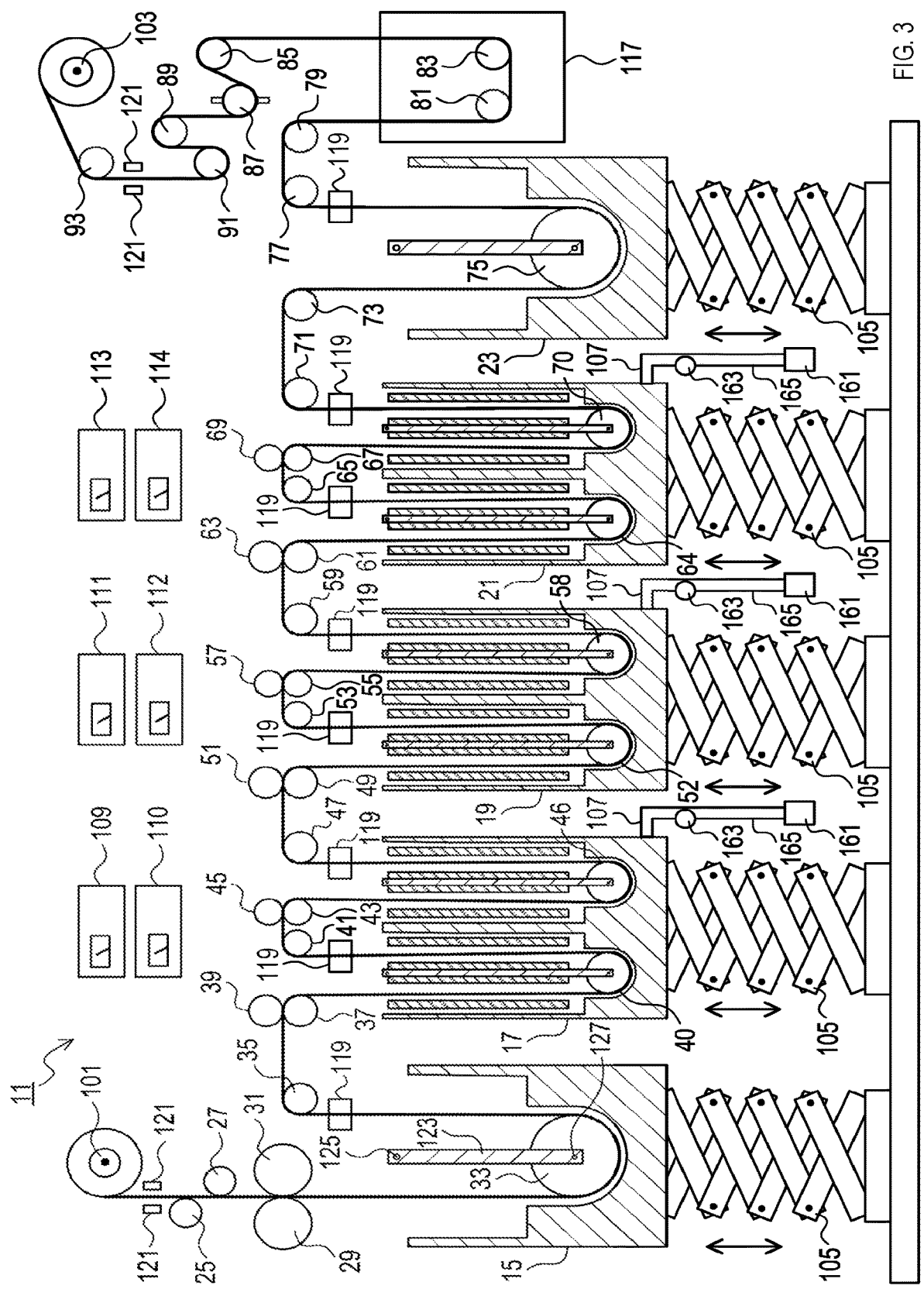
FIG. 3 is an explanatory view showing a configuration of the electrode material manufacturing apparatus.

As shown in FIG. 3, the electrode material manufacturing apparatus 11 comprises an immersing tank 15, doping tanks 17, 19, 21, a cleaning tank 23, conveyor rollers 25, 27, 29, 31, 33, 35, 37, 39, 40, 41, 43, 45, 46, 47, 49, 51, 52, 53, 55, 57, 58, 59, 61, 63, 64, 65, 67, 69, 70, 71, 73, 75, 77, 79, 81, 83, 85, 87, 89, 91, 93 (hereafter also collectively referred to as a conveyor roller group), a supply roll 101, a winding roll 103, a support 105, a circulation filtration unit 107, six power supplies 109, 110, 111, 112, 113, 114, a tab cleaner 117, a solution collecting unit 119, and an end portion sensor 121. The conveyor roller group corresponds to a conveyer unit.

The immersing tank 15 is a rectangular tank with an open top. The immersing tank 15 has a bottom surface having a generally U-shaped section. The immersing tank 15 comprises a partition plate 123. The partition plate 123 is supported by a support rod 125 penetrating an upper end of the partition plate 123. The support rod 125 is fixed to a wall or the like (not shown). The partition plate 123 extends vertically, and divides the inside of the immersing tank 15 into two spaces. The partition plate 123 has the conveyor roller 33 attached to a lower end thereof. The partition plate 123 and the conveyor roller 33 are supported by a support rod 127 penetrating the partition plate 123 and the conveyor roller 33. The partition plate 123 is notched in the vicinity of the lower end thereof so as not to come in contact with the conveyor roller 33. There is a space between the conveyor roller 33 and the bottom surface of the immersing tank 15.

Figure 4:
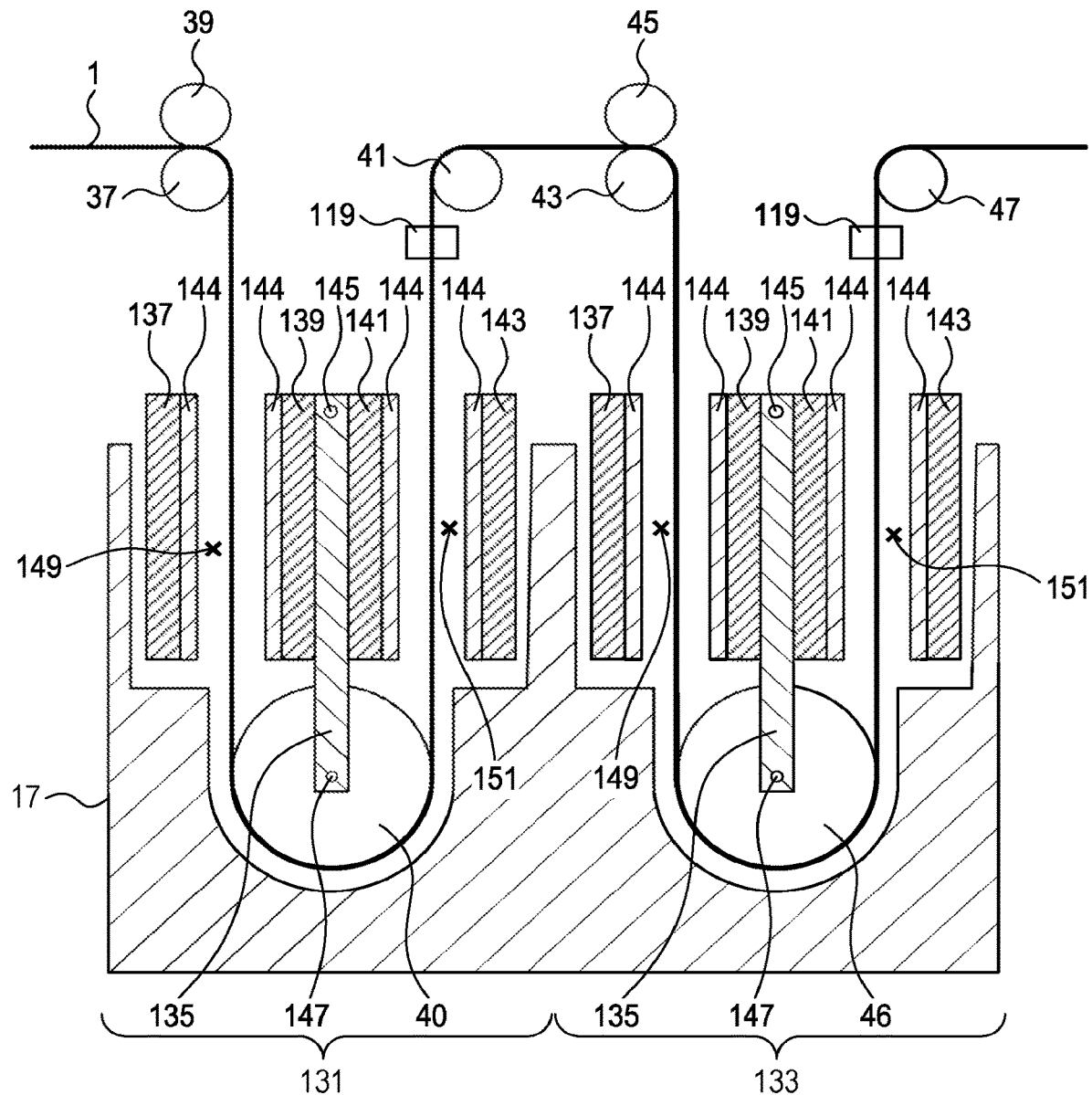
FIG. 4 is an explanatory view showing a configuration of a doping tank.

A configuration of the doping tank 17 will be described with reference to FIG. 4. The doping tank 17 comprises an upstream tank 131 and a downstream tank 133. The upstream tank 131 is arranged on a side of the supply roll 101 (hereinafter, referred to as an upstream side), and the downstream tank 133 is arranged on a side of the winding roll 103 (hereinafter, referred to as a downstream side).

First, a configuration of the upstream tank 131 will be described. The upstream tank 131 is a rectangular tank with an open top. The upstream tank 131 has a bottom surface having a generally U-shaped section. The upstream tank 131 comprises a partition plate 135, four counter electrode members 137, 139, 141, 143 and four masks 144.

The partition plate 135 is supported by a support rod 145 penetrating an upper end of the partition plate 135. The support rod 145 is fixed to a wall or the like (not shown). The partition plate 135 extends vertically, and divides the inside of the upstream tank 131 into two spaces. The partition plate 135 has the conveyor roller 40 attached to the lower end thereof. The partition plate 135 and the conveyor roller 40 are supported by a support rod 147 penetrating the partition plate 135 and the conveyor roller 40. The partition plate 135 is notched in the vicinity of the lower end thereof so as not to come in contact with the conveyor roller 40. There is a space between the conveyor roller 40 and the bottom surface of the upstream tank 131.

The counter electrode member 137 is arranged on the upstream side in the upstream tank 131. The counter electrode members 139, 141 are arranged so as to hold the partition plate 135 from both sides. The counter electrode member 143 is arranged on the downstream side in the upstream tank 131.

There is a space 149 between the counter electrode member 137 and the counter electrode member 139. There is a space 151 between the counter electrode member 141 and the counter electrode member 143. The counter electrode members 137, 139, 141, 143 are connected to one electrode of the power supply 109. The counter electrode members 137, 139, 141, 143 have similar configurations. Here, configurations of the counter electrode members 137, 139 will be described with reference to FIG. 5.

The counter electrode members 137, 139 have a configuration in which a conductive base material 153, an alkali metal-containing plate 155, and a porous insulation member 157 are stacked. Examples of a material for the conductive base material 153 may include copper, stainless steel, and nickel. The alkali metal-containing plate 155 is not limited to a specific form, and may be, for example, an alkali metal plate and an alkali metal alloy plate. The alkali metal-containing plate 155 may have a thickness of, for example, 0.03 to 5 mm.

The porous insulation member 157 has a plate shape. The porous insulation member 157 is stacked on the alkali metal-containing plate 155. The plate shape of the porous insulation member 157 is a shape when the porous insulation member 157 is stacked on the alkali metal-containing plate 155. The porous insulation member 157 may be a member that maintains a certain shape by itself or may be a member that can be easily deformed, such as a net.

The porous insulation member 157 is porous. Thus, a dope solution described later can pass through the porous insulation member 157. This allows the alkali metal-containing plate 155 to come in contact with the dope solution.

Examples of the porous insulation member 157 may include a mesh made of resin. Examples of the resin may include polyethylene, polypropylene, nylon, polyetheretherketone, and polytetrafluoroethylene. A mesh opening of the mesh can be suitably set. The mesh opening of the mesh may be from 0.1 µm to 10 mm, and preferably from 0.1 to 5 mm. The thickness of the mesh can be suitably set. The thickness of the mesh may be, for example, 1 µm to 10 mm, and preferably 30 µm to 1 mm. A mesh opening ratio of the mesh can be suitably set. The mesh opening ratio of the mesh may be, for example, 5 to 98%, and preferably 5 to 95%, and further preferably 50 to 95%.

The porous insulation member 157 may be entirely made of an insulating material, or may partially comprise an insulating layer.

Figure 5:
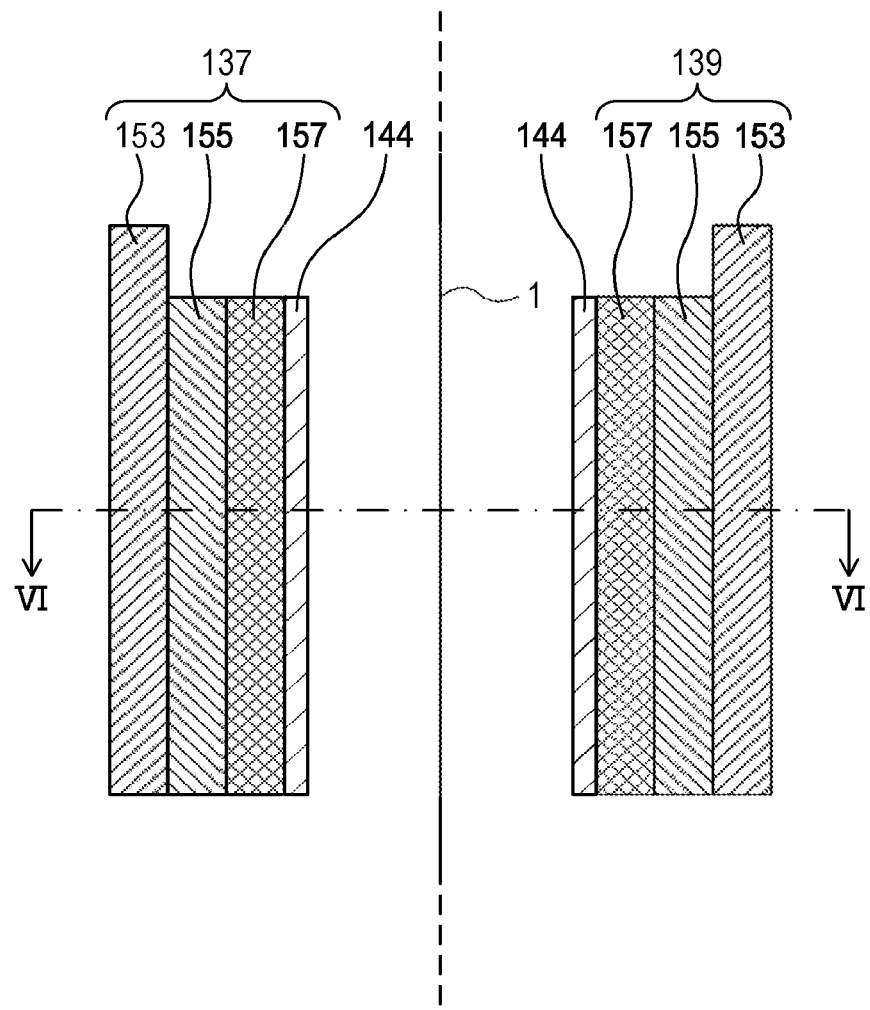
FIG. 5 is an explanatory view showing a configuration of counter electrode members and masks.

The counter electrode members 137, 139, 141, 143 each have a mask 144 attached thereto. The mask 144 is attached to a surface of each counter electrode member 137, 139, 141, 143 on a side of the porous insulation member 157. FIG. 5 shows the masks 144 attached to the counter electrode members 137, 139. The mask 144 covers a part of each counter electrode member 137, 139, 141, 143, and exposes the rest portion. The detailed shape of the mask 144 will be described later. Examples of a material for the mask 144 may include polyethylene, polypropylene, nylon, polyetheretherketone, polytetrafluoroethylene. The mask 144 is preferably made of polypropylene. The thickness of the mask 144 is preferably 10 µm or more and 10 mm or less, and further preferably 50 µm or more and 5 mm or less.

The downstream tank 133 has a configuration similar to that of the upstream tank 131. However, the downstream tank 133 has the conveyor roller 46 therein instead of the conveyor roller 40. Also, the downstream tank 133 comprises counter electrode members 137, 139, 141, 143 connected to one electrode of the power supply 110.

The doping tank 19 comprises a configuration similar to that of the doping tank 17. However, the doping tank 19 has conveyor rollers 52, 58 therein instead of the conveyor rollers 40, 46. The upstream tank 131 of the doping tank 19 comprises the counter electrode members 137, 139, 141, 143 connected to one electrode of the power supply 111. Also, the downstream tank 133 of the doping tank 19 comprises the counter electrode members 137, 139, 141, 143 connected to one electrode of the power supply 112.

The doping tank 21 comprises a configuration similar to that of the doping tank 17. However, the doping tank 21 has conveyor rollers 64, 70 therein instead of the conveyor rollers 40, 46. The upstream tank 131 of the doping tank 21 comprises the counter electrode members 137, 139, 141, 143 connected to one electrode of the power supply 113. Also, the downstream tank 133 of the doping tank 21 comprises the counter electrode members 137, 139, 141, 143 connected to one electrode of the power supply 114.

The cleaning tank 23 has a configuration similar to that of the immersing tank 15. However, the cleaning tank 23 has the conveyor roller 75 therein instead of the conveyor roller 33.

In the conveyor roller group, the conveyor rollers 37, 39, 43, 45, 49, 51, 55, 57, 61, 63, 67, 69 are made of an electrically conductive material. In the conveyor roller group, the remaining conveyor rollers are made of elastomer except for bearing portions. The conveyor roller group conveys the electrode material 1 along a specified path. The path along which the conveyor roller group conveys the electrode material 1 is a path from the supply roll 101 to the winding roll 103 sequentially through the immersing tank 15, the doping tank 17, the doping tank 19, the doping tank 21, the cleaning tank 23, and the tab cleaner 117.

A part of the path passing through the immersing tank 15 first runs downward by the conveyor rollers 29, 31, then the path is directed upward by the conveyor roller 33.

A part of the above-described path passing through the doping tank 17 will be described below. First, the path is directed downward by the conveyor roller 37, and the path runs downward in the space 149 of the upstream tank 131. Then, the path is directed upward by the conveyor roller 40, and the path runs upward in the space 151 of the upstream tank 131. Then, the path is directed downward by the conveyor rollers 41, 43, and the path runs downward in the space 149 of the downstream tank 133. Then, the path is directed upward by the conveyor roller 46, and the path runs upward in the space 151 of the downstream tank 133. Finally, the path is directed in a horizontal direction by the conveyor roller 47, and the path runs toward the doping tank 19.

A part of the above-described path passing through the doping tank 19 will be described below. First, the path is directed downward by the conveyor roller 49, and the path runs downward in the space 149 of the upstream tank 131. Then, the path is directed upward by the conveyor roller 52, and the path runs upward in the space 151 of the upstream tank 131. Then, the path is directed downward by the conveyor rollers 53, 55, and the path runs downward in the space 149 of the downstream tank 133. Then, the path is directed upward by the conveyor roller 58, and the path runs upward in the space 151 of the downstream tank 133. Finally, the path is directed in the horizontal direction by the conveyor roller 59, and the path runs toward the doping tank 21.

A part of the above-described path passing through the doping tank 21 will be described below. First, the path of the path is directed downward by the conveyor roller 61, and the path runs downward in the space 149 of the upstream tank 131. Then, the path is directed upward by the conveyor roller 64, and the path runs upward in the space 151 of the upstream tank 131. Then, the path is directed downward by the conveyor rollers 65, 67, and the path runs downward in the space 149 of the downstream tank 133. Then, the path is directed upward by the conveyor roller 70, and the path runs upward in the space 151 of the downstream tank 133. Finally, the path is directed in the horizontal direction by the conveyor roller 71, and the path runs toward the cleaning tank 23.

A part of the above-described path passing through the cleaning tank 23 is a path whose path is first directed downward by the conveyor roller 73 and the path runs downward, then, the path is directed upward by the conveyor roller 75.

The supply roll 101 has the electrode material 1 wound around the supply roll 101. That is, the supply roll 101 holds the electrode material 1 in a wound-up state. The electrode material 1 held by the supply roll 101 is in a non-doped state.

The conveyor roller group draws out and conveys the electrode material 1 held by the supply roll 101.

The winding roll 103 winds up and keeps the electrode material 1 that is conveyed by the conveyor roller group. The electrode material 1 conveyed by the conveyor roller group is pre-doped with alkali metal in the doping tanks 17, 19, 21.

The supports 105 support the immersing tank 15, the doping tanks 17, 19, 21, and the cleaning tank 23 from below. The height of the support 105 can be changed. The circulation filtration unit 107 is provided to the respective doping tanks 17, 19, 21. The circulation filtration unit 107 comprises a filter 161, a pump 163, and a pipe 165.

In the circulation filtration unit 107 provided to the doping tank 17, the pipe 165 is a circulation pipe that extends from the doping tank 17, sequentially passes through the pump 163 and the filter 161, and then returns to the doping tank 17. The dope solution in the doping tank 17 is circulated through the pipe 165 and the filter 161 by a driving force of the pump 163, and returns to the doping tank 17. During this period, impurities and the like in the dope solution are filtered by the filter 161. Examples of the impurities may include impurities precipitated from the dope solution and impurities produced from the electrode material 1. Examples of the material for the filter 161 may include resin, such as polypropylene, polytetrafluoroethylene. The pore diameter of the filter 161 may be suitably set. The pore diameter of the filter 161 may be, for example, 0.2 µm to 50 µm.

The circulation filtration units 107 provided to the doping tanks 19, 21 also have the similar configuration and functional effects. In FIG. 3 and FIG. 4, illustration of the dope solution is omitted for the purpose of convenience.

One terminal of the power supply 109 is connected to the conveyor rollers 37, 39. Also, the other terminal of the power supply 109 is connected to the counter electrode members 137, 139, 141, 143 that the upstream tank 131 of the doping tank 17 comprises. The electrode material 1 is in contact with the conveyor rollers 37, 39. The electrode material 1 and the counter electrode members 137, 139, 141, 143 are located in the dope solution that is an electrolyte solution. Thus, in the upstream tank 131 of the doping tank 17, the electrode material 1 and the counter electrode members 137, 139, 141, 143 are electrically connected through the electrolyte solution.

One terminal of the power supply 110 is connected to the conveyor rollers 43, 45. Also, the other terminal of the power supply 110 is connected to the counter electrode members 137, 139, 141, 143 that the downstream tank 133 of the doping tank 17 comprises. The electrode material 1 is in contact with the conveyor rollers 43, 45. The electrode material 1 and the counter electrode members 137, 139, 141, 143 are located in the dope solution that is the electrolyte solution. Thus, in the downstream tank 133 of the doping tank 17, the electrode material 1 and the counter electrode members 137, 139, 141, 143 are electrically connected through the electrolyte solution.

One terminal of the power supply 111 is connected to the conveyor rollers 49, 51. Also, the other terminal of the power supply 111 is connected to the counter electrode members 137, 139, 141, 143 that the upstream tank 131 of the doping tank 19 comprises. The electrode material 1 is in contact with the conveyor rollers 49, 51. The electrode material 1 and the counter electrode members 137, 139, 141, 143 are located in the dope solution that is the electrolyte solution. Thus, in the upstream tank 131 of the doping tank 19, the electrode material 1 and the counter electrode members 137, 139, 141, 143 are electrically connected through the electrolyte solution.

One terminal of the power supply 112 is connected to the conveyor rollers 55, 57. Also, the other terminal of the power supply 112 is connected to the counter electrode members 137, 139, 141, 143 that the downstream tank 133 of the doping tank 19 comprises. The electrode material 1 is in contact with the conveyor rollers 55, 57. The electrode material 1 and the counter electrode members 137, 139, 141, 143 are located in the dope solution that is the electrolyte solution. Thus, in the downstream tank 133 of the doping tank 19, the electrode material 1 and the counter electrode members 137, 139, 141, 143 are electrically connected through the electrolyte solution.

One terminal of the power supply 113 is connected to the conveyor rollers 61, 63. Also, the other terminal of the power supply 113 is connected to the counter electrode members 137, 139, 141, 143 that the upstream tank 131 of the doping tank 21 comprises. The electrode material 1 is in contact with the conveyor rollers 61, 63. The electrode material 1 and the counter electrode members 137, 139, 141, 143 are located in the dope solution that is the electrolyte solution. Thus, in the upstream tank 131 of the doping tank 21, the electrode material 1 and the counter electrode members 137, 139, 141, 143 are electrically connected through the electrolyte solution.

One terminal of the power supply 114 is connected to the conveyor rollers 67, 69. Also, the other terminal of the power supply 114 is connected to the counter electrode members 137, 139, 141, 143 that the downstream tank 133 of the doping tank 21 comprises. The electrode material 1 is in contact with the conveyor rollers 67, 69. The electrode material 1 and the counter electrode members 137, 139, 141, 143 are located in the dope solution that is the electrolyte solution. Thus, in the downstream tank 133 of the doping tank 21, the electrode material 1 and the counter electrode members 137, 139, 141, 143 are electrically connected through the electrolyte solution.

The tab cleaner 117 cleans an end portion of the electrode material 1 in the width direction W. The solution collecting unit 119 is provided to each of the immersing tank 15, the doping tanks 17, 19, 21, and the cleaning tank 23. The solution collecting unit 119 collects solution taken from the tank by the electrode material 1, and returns the collected solution to the tank.

The end portion sensor 121 detects a position of the end portion of the electrode material 1 in the width direction W. Based on a detection result of the end portion sensor 121, an end position adjusting unit, which is not shown, adjusts positions of the supply roll 101 and the winding roll 103 in the width direction W. The end position adjusting unit adjusts the positions of the supply roll 101 and the winding roll 103 in the width direction W so that the end portion of the electrode material 1 in the width direction W is located at a position where the end portion is cleaned by the tab cleaner 117.

3. Configuration of Mask 144

Figure 6:
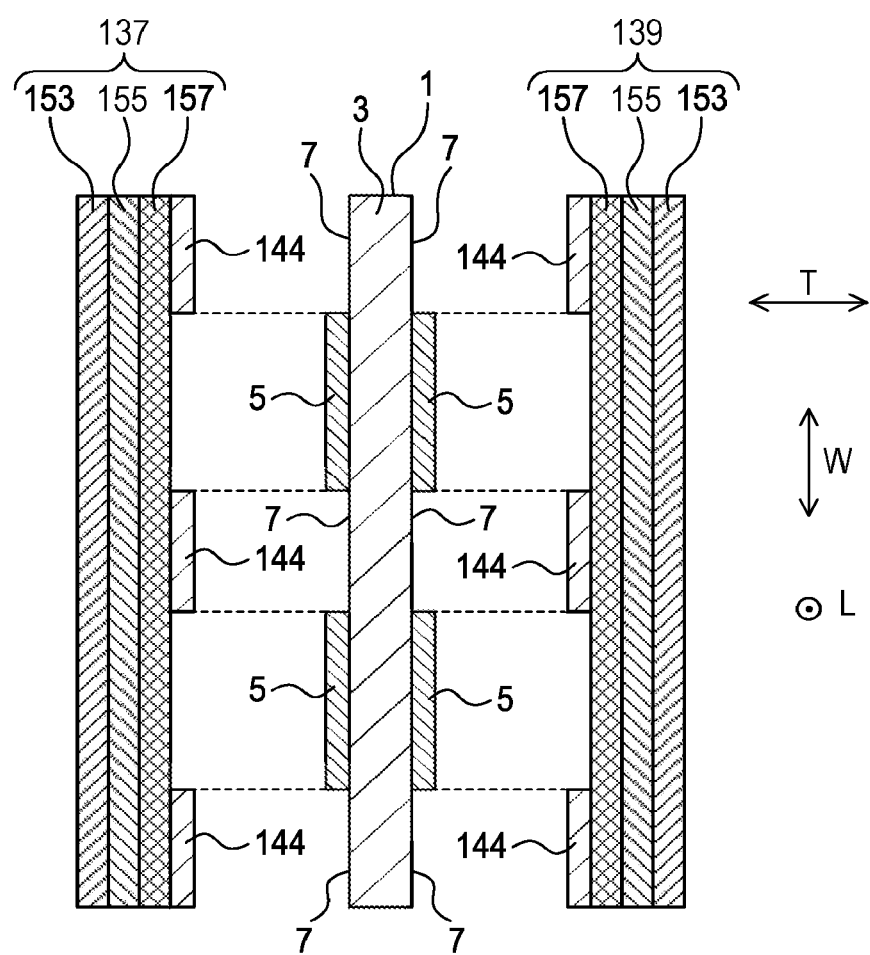
FIG. 6 is a sectional view taken along VI-VI section of FIG. 5.

With reference to FIG. 6, a configuration of the mask 144 will be described. FIG. 6 shows the masks 144 attached to the counter electrode members 137, 139. The masks 144 attached to the counter electrode members 141, 143 also have a similar configuration.

The mask 144 covers the exposed portion 7 in the electrode material 1. The meaning of covering the exposed portion 7 is that the mask 144 is overlapped with the exposed portion 7 when seen from a thickness direction T of the electrode material 1. The mask 144 does not cover the active material layer 5.

The mask 144 may entirely or partially cover the exposed portion 7. Also, the mask 144 may cover a part of the active material layer 5 in addition to the exposed portion 7.

4. Composition of Dope Solution

When the electrode material manufacturing apparatus 11 is used, a dope solution is stored in the doping tanks 17, 19, 21. The dope solution comprises alkali metal ions and a solvent. Examples of the solvent may include an organic solvent. The organic solvent is preferably an aprotic organic solvent. Examples of the aprotic organic solvent may include ethylene carbonate, propylene carbonate, butylene carbonate, dimethyl carbonate, diethyl carbonate, methyl ethyl carbonate, 1-fluoroethylene carbonate, γ-butyrolactone, acetonitrile, dimethoxyethane, tetrahydrofuran, dioxolane, methylene chloride, sulfolane, diethylene glycol dimethyl ether (diglyme), diethylene glycol methyl ethyl ether, triethylene glycol dimethyl ether (triglyme), triethylene glycol butyl methyl ether, and tetraethylene glycol dimethyl ether (tetraglyme).

Also, as the organic solvent, ionic liquid, such as quaternary imidazolium salt, quaternary pyridinium salt, quaternary pyrrolidinium salt, quaternary piperidinium salt and the like may be used. The organic solvent may be made of a single component, or may be a mixed solvent of two or more types of components.

The alkali metal ions included in the dope solution are ions forming an alkali metal salt. The alkali metal salt is preferably a lithium salt or a sodium salt. Examples of an anionic moiety forming the alkali metal salt may include phosphorus anion having a fluoro group, such as $PF_6^-$, $PF_3(C_2F_5)_3^-$, $PF_3(CF_3)_3^-$; boron anion having a fluoro group or a cyano group, such as $BF_4^-$, $BF_2(CF)_2^-$, $BF_3(CF_3)^-$, and $B(CN)_4^-$; sulfonyl imide anion having a fluoro group, such as $N(FSO_2)_2^-$, $N(CF_3SO_2)_2^-$, and $N(C_2F_5SO_2)_2^-$; and organic sulfonic acid anion having a fluoro group, such as $CF_3SO_3^-$.

A concentration of the alkali metal salt in the dope solution is preferably 0.1 mol/L or more, and more preferably within a range of 0.5 to 1.5 mol/L. When the concentration of the alkali metal salt is within this range, pre-doping of the alkali metal proceeds efficiently.

The dope solution may further comprise additives, such as vinylene carbonate, vinylethylene carbonate, 1-fluoroethylene carbonate, 1-(trifluoromethyl) ethylene carbonate, succinic anhydride, maleic anhydride, propane sultone, and diethyl sulfone.

The dope solution may further comprise a flame retardant, such as a phosphazene compound. From the viewpoint of effective control of a thermal runaway reaction while doping the alkali metal, an added amount of the flame retardant is preferably 1 part by mass or more, more preferably 3 parts by mass or more, and further preferably 5 parts by mass or more, with respect to 100 parts by mass of the dope solution. From the viewpoint of obtaining a high-quality doped electrode, the added amount of the flame retardant is preferably 20 parts by mass or less, more preferably 15 parts by mass or less, and further preferably 10 parts by mass or less, with respect to 100 parts by mass of the dope solution.

5. Configuration of Cutting Device 13 of Electrode Manufacturing System

Figure 7:
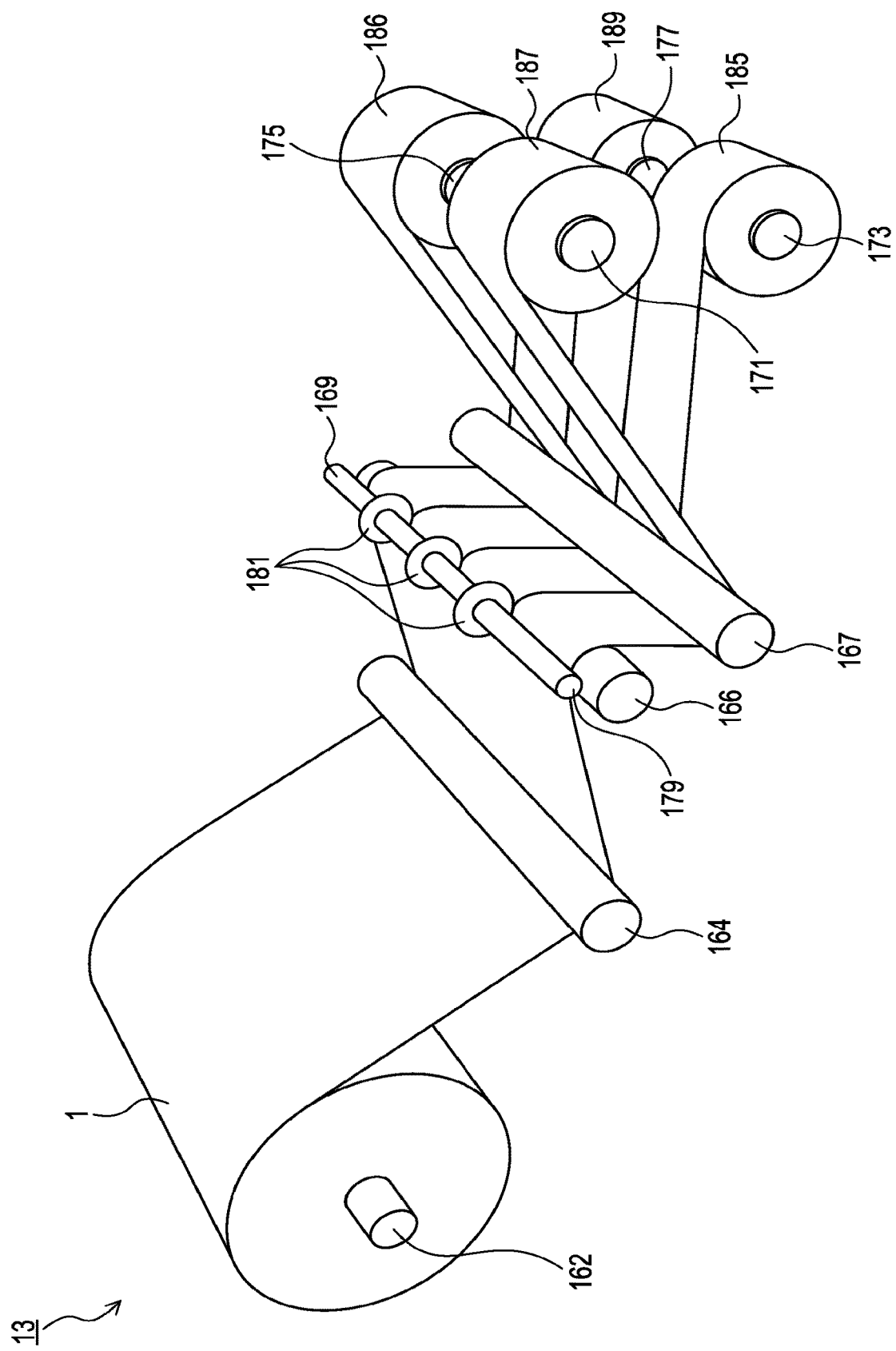
FIG. 7 is a perspective view showing a configuration of a cutting device.

A configuration of the cutting device 13 will be described with reference to FIG. 7. The cutting device 13 comprises a supply roll 162, a conveyor rollers 164, 166, 167, a slitter 169, and a winding rolls 171, 173, 175, 177.

The supply roll 162 has the electrode material 1 wound around the supply roll 162. The electrode material 1 wound around the supply roll 162 is pre-doped using the electrode material manufacturing apparatus 11. The electrode material 1 is drawn from the supply roll 162 and is conveyed toward the winding rolls 171, 173, 175, 177 while guided by the conveyor rollers 164, 166, 167.

The slitter 169 comprises a body shaft 179, two or more circular blades 181. The two or more circular blades 181 are attached to the body shaft 179 at specified intervals. The slitter 169 is arranged so as to be opposed to the conveyor roller 166. The two or more circular blades 181 cut the electrode material 1 along the longitudinal direction L when the electrode material 1 passes between the slitter 169 and the conveyor roller 166. The electrode material 1 is cut along three cut ends 183 shown in FIG. 1. As a result, from the electrode material 1, two electrodes 185, 186, a first remaining part 187, and a second remaining part 189 are produced. The first remaining part 187 and the second remaining part 189 are remaining portions not to be used for electrodes. The three cut ends 183 each pass through the exposed portion 7.

The winding roll 171 winds up the first remaining part 187. The winding roll 173 winds up the electrode 185. The winding roll 175 winds up the electrode 186. The winding roll 177 winds up the second remaining part 189.

6. Method for Manufacturing Electrode

First, as a preparation for manufacturing the electrode, the following procedures are performed. The electrode material 1 in the non-doped state is wound around the supply roll 101. Then, the electrode material 1 is drawn from the supply roll 101, and is fed to the winding roll 103 along the aforementioned path. Then, the immersing tank 15, the doping tanks 17, 19, 21, and the cleaning tank 23 are raised and set at a specified position shown in FIG. 3.

The dope solution is stored in the immersing tank 15, and the doping tanks 17, 19, 21. The dope solution is the solution described in a section of "4. Composition of Dope Solution". A cleaning solution is stored in the cleaning tank 23. The cleaning solution is an organic solvent. Then, the electrode material 1 is conveyed, by the conveyor roller group, from the supply roll 101 to the winding roll 103, along the aforementioned path. When the electrode material 1 is passed through the doping tanks 17, 19, 21, the active material included in the active material layer 5 is pre-doped with alkali metal.

The electrode material 1 is cleaned in the cleaning tank 23 while being conveyed by the conveyor roller group. Then, the electrode material 1 is wound around the winding roll 103. The electrode material 1 may be a positive electrode or a negative electrode. In the case of manufacturing a positive electrode, in the electrode material manufacturing apparatus 11, a positive electrode active material is doped with alkali metal, and in the case of manufacturing a negative electrode, in the electrode material manufacturing apparatus 11, a negative electrode active material is doped with alkali metal.

When lithium is occluded in a negative electrode active material of a lithium ion capacitor, a doping amount of alkali metal is preferably 70 to 95% with respect to a theoretical capacity of the negative electrode active material; and when lithium is occluded in a negative electrode active material of a lithium-ion rechargeable battery, the doping amount is preferably 10 to 30% with respect to the theoretical capacity of the negative electrode active material.

Finally, the electrode material 1 that is wounded around the winding roll 103 is cut using the cutting device 13. According to the above-described procedures, the electrodes 185, 186 can be obtained.

7. Effects Achieved by Electrode Manufacturing System (1A) The electrode manufacturing system is capable of manufacturing two or more electrodes 185, 186 from one electrode material 1. Thus, the electrode manufacturing system can manufacture the electrodes 185, 186 efficiently.

(1B) The cutting device 13 cuts the electrode material 1 along the cut end 183 passing through the exposed portion 7. Thus, the cutting device 13 inhibits the active material layer 5 from being positioned in the end portion in the width direction W of the manufactured electrodes 185, 186.

(1C) The electrode manufacturing system comprises the electrode material manufacturing apparatus 11. Thus, in the electrode manufacturing system, a pre-doped electrode material 1 can be easily manufactured.

(1D) The electrode material manufacturing apparatus 11 comprises the mask 144. The mask 144 is arranged between the electrode material 1 in the doping tanks 17, 19, 21 and the counter electrode members 137, 139, 141, 143, and covers the exposed portion 7. Thus, the electrode material manufacturing apparatus 11 can inhibit a precipitation of alkali metal on the exposed portion 7.

Second Embodiment

1. Difference from First Embodiment

Since a second embodiment has a basic configuration similar to that of the first embodiment, differences therebetween will be described below. It is to be noted that the same reference numerals as those in the first embodiment indicate similar configurations, and reference is made to the preceding description.

In the first embodiment described above, the counter electrode members 137, 139, 141, 143 each comprise the mask 144 attached thereto. In contrast, the second embodiment is different from the first embodiment in that the counter electrode members 137, 139, 141, 143 are divided without comprising the mask 144.

Figure 8:
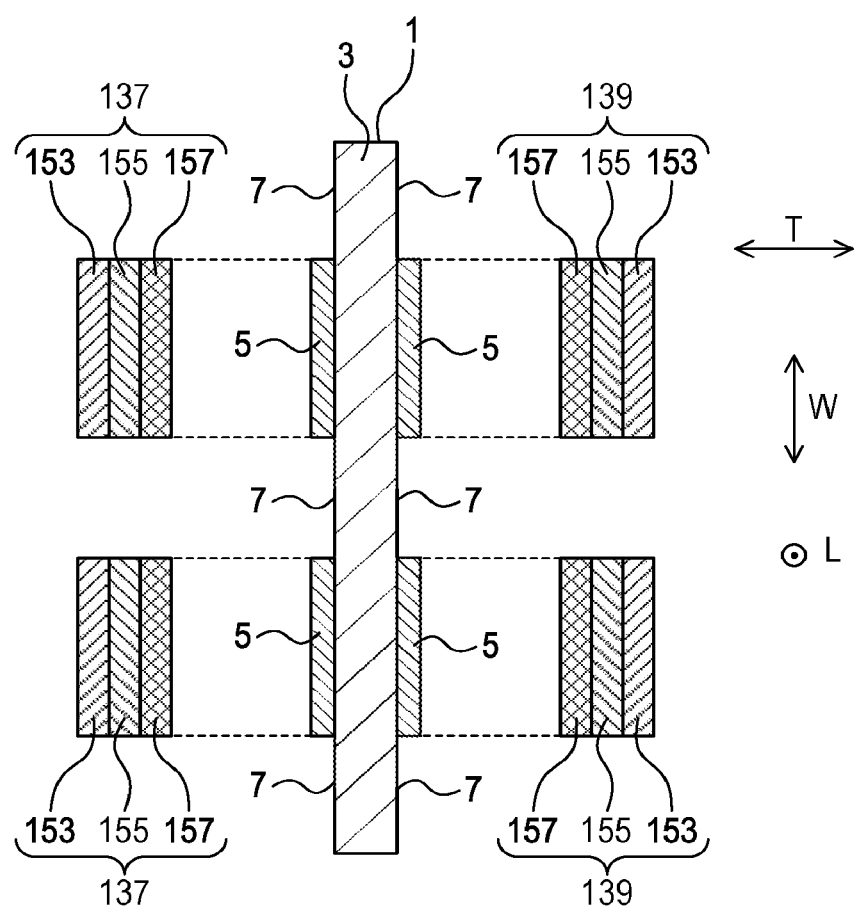
FIG. 8 is an explanatory view showing a configuration of divided counter electrode members.

FIG. 8 shows a configuration of the counter electrode members 137, 139. The divided counter electrode members 137, 139 are arranged in the portions opposed to the active material layers 5 when seen from the thickness direction T. The counter electrode members 137, 139 are not arranged in the portions opposed to the exposed portions 7 when seen from the thickness direction T. The counter electrode members 141, 143 also have a configuration similar to that of the counter electrode members 137, 139.

2. Effects Achieved by Electrode Manufacturing System

According to the second embodiment detailed above, the following effects are achieved in addition to the aforementioned effects (1A) to (1C) of the first embodiment.

(2A) The counter electrode members 137, 139, 141, 143 are divided and arranged only in the portions opposed to the active material layers 5. The counter electrode members 137, 139, 141, 143 are not arranged in the portions opposed to the exposed portions 7. Thus, the electrode material manufacturing apparatus 11 inhibits the precipitation of alkali metal on the exposed portion 7.

Other Embodiments

Although some embodiments of the present disclosure have been described as above, the present disclosure is not limited to the above-described embodiments, but may be practiced in various modified forms.

(1) The electrode material 1 may have another configuration. For example, the electrode material 1 may have a configuration shown in FIG. 9. The electrode material 1 comprises four active material layers 5. The exposed portions 7 are formed between two active material layers 5 adjacent to each other in the width direction W, and also formed at both ends in the width direction W.

The electrode material manufacturing apparatus 11 inhibits the precipitation of alkali metal on the exposed portion 7 by the mask 144 of the first embodiment, or by the divided the counter electrode members 137, 139, 141, 143 of the second embodiment.

Figure 9:
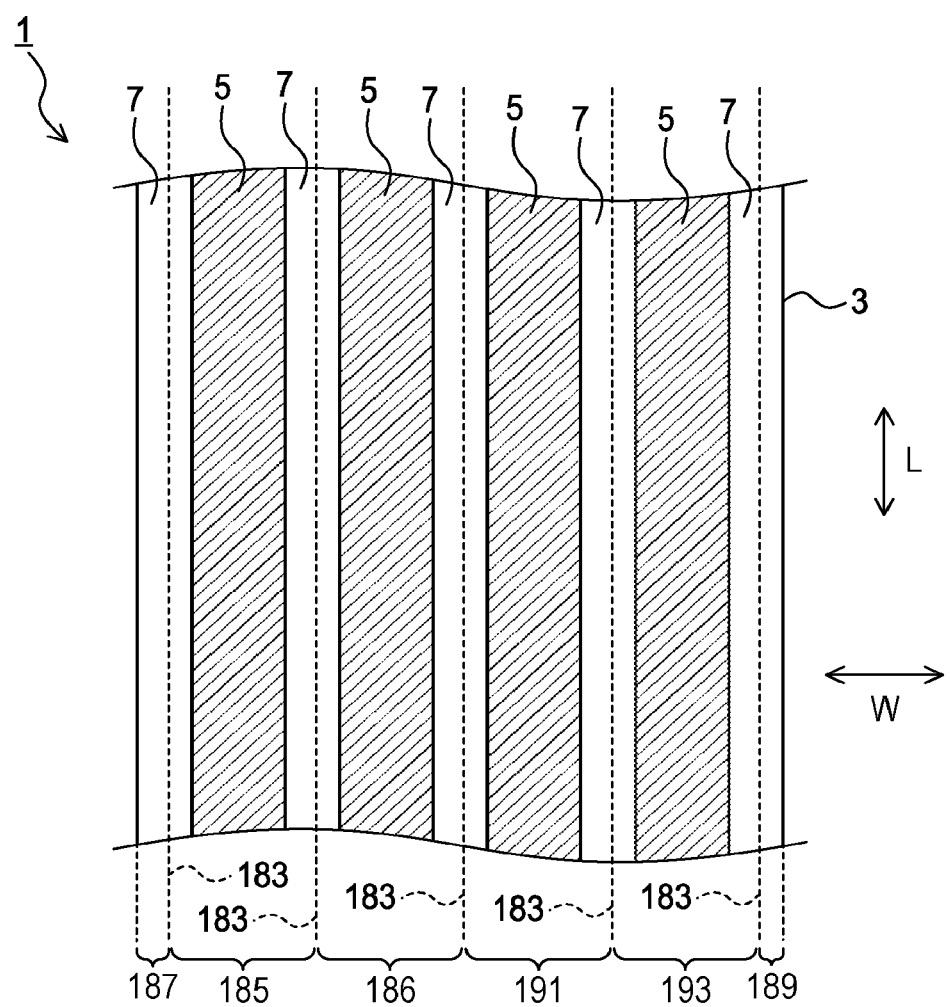
FIG. 9 is a plan view showing a configuration of an electrode material in another embodiment.

The cutting device 13 cuts the electrode material 1 along five cut ends 183 shown in FIG. 9. As a result, four electrodes 185, 186, 191, 193 are manufactured.

(2) The electrode material 1 may have another configuration. For example, the electrode material 1 may have a configuration shown in FIG. 10. The electrode material 1 comprises the active material layer 5 in a central portion in the width direction W. The active material layer 5 is divided to a doped portion 5A and a non-doped portion 5B.

The doped portion 5A is pre-doped with alkali metal through a treatment using the electrode material manufacturing apparatus 11. The doped portion 5A corresponds to the first section. The non-doped portion 5B is not pre-doped with alkali metal even after the treatment using the electrode material manufacturing apparatus 11. That is, a pre-doped active material is absent in the non-doped portion 5B even after the treatment using the electrode material manufacturing apparatus 11. The non-doped portion 5B corresponds to the second section.

In the electrode material manufacturing apparatus 11, the doped portion 5A is pre-doped, and the non-doped portion 5B is not pre-doped by the mask 144 of the first embodiment, or by the divided counter electrode members 137, 139, 141, 143 of the second embodiment. The electrode material manufacturing apparatus 11 inhibits the precipitation of alkali metal on the exposed portion 7 by the mask 144 of the first embodiment, or by the divided counter electrode members 137, 139, 141, 143 of the second embodiment.

Figure 10:
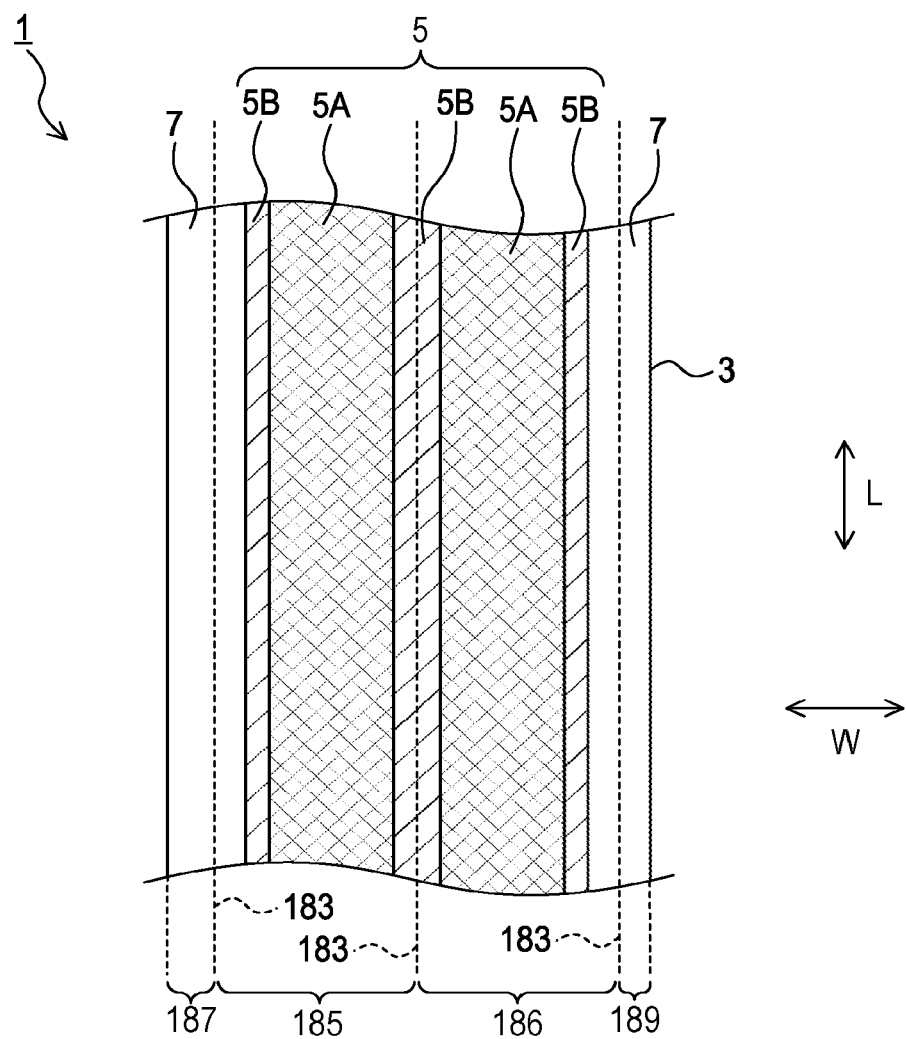
FIG. 10 is a plan view showing a configuration of an electrode material in another embodiment.

The cutting device 13 cuts the electrode material 1 along three cut ends 183 shown in FIG. 10. As a result, two electrodes 185, 186 are manufactured. The cut ends 183 pass through the non-doped portion 5B or the exposed portion 7.

(3) The electrode material 1 may have another configuration. For example, the electrode material 1 may have a configuration shown in FIG. 11. The electrode material 1 comprises two active material layers 5. The exposed portions 7 are formed between the two active material layers 5, and also formed at both ends in the width direction W. Each active material layer 5 is divided to the doped portion 5A and the non-doped portion 5B.

The doped portion 5A is pre-doped with alkali metal by the treatment using the electrode material manufacturing apparatus 11. The doped portion 5A corresponds to the first section. The non-doped portion 5B is not pre-doped with alkali metal even after the treatment using the electrode material manufacturing apparatus 11. That is, the pre-doped active material is absent in the non-doped portion 5B even after the treatment using the electrode material manufacturing apparatus 11. The non-doped portion 5B corresponds to the second section.

In the electrode material manufacturing apparatus 11, the doped portion 5A is pre-doped, and the non-doped portion 5B is not pre-doped by the mask 144 of the first embodiment, or by the divided the counter electrode members 137, 139, 141, 143 of the second embodiment. The electrode material manufacturing apparatus 11 inhibits the precipitation of alkali metal on the exposed portion 7 by the mask 144 of the first embodiment, or by the divided counter electrode members 137, 139, 141, 143 of the second embodiment.

Figure 11:
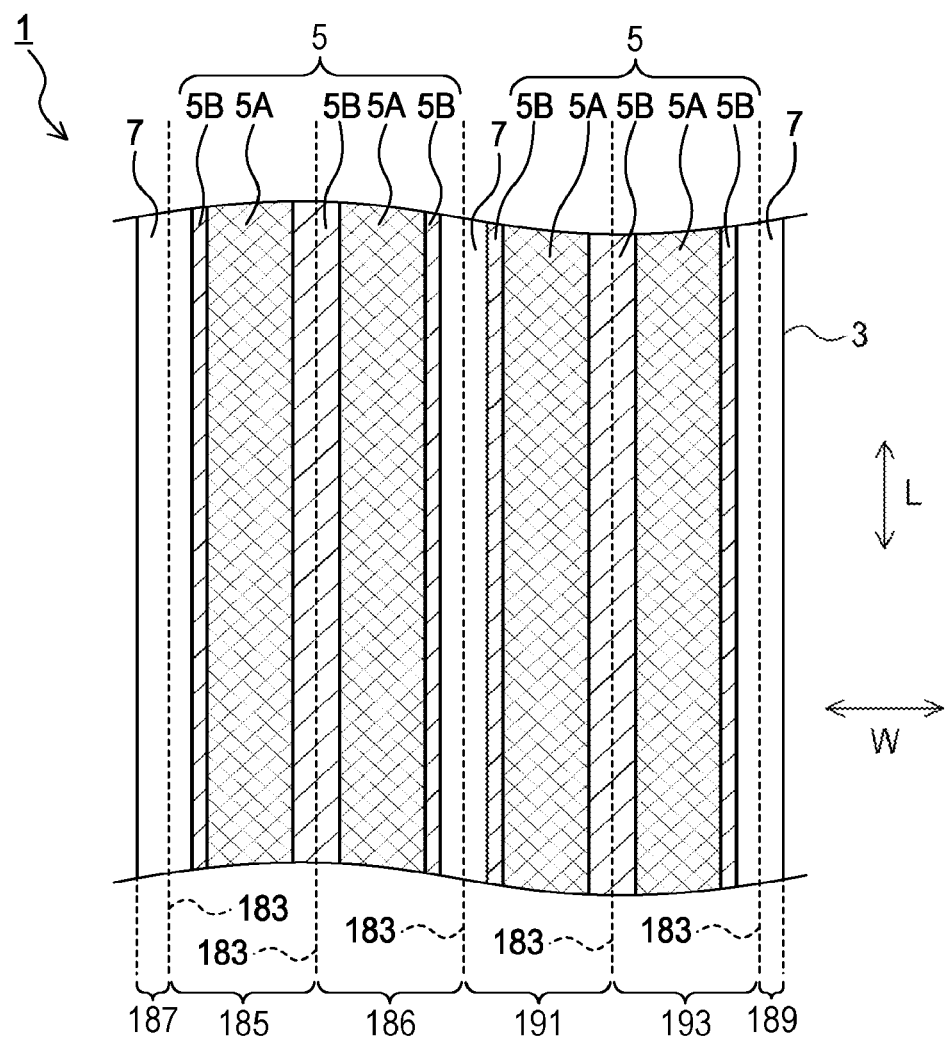
FIG. 11 is a plan view showing a configuration of an electrode material in another embodiment.

The cutting device 13 cuts the electrode material 1 along five cut ends 183 shown in FIG. 11. As a result, four electrodes 185, 186, 191, 193 are manufactured. The cut ends 183 pass through the non-doped portion 5B or the exposed portion 7.

(4) In each embodiment described above, a connection mode of the power supply, the conveyor rollers, and each counter electrode member is the one in which the conveyor rollers and each counter electrode member are connected to a different power supply for each doping tank; however, another connection mode may be adopted. For example, a connection mode may be adopted in which the counter electrode member opposed to one surface of the electrode material 1 and the counter electrode member opposed to the other surface of the electrode material 1 may be connected to different power supplies (hereinafter, referred to as a mode A). In the mode A, an amount of alkali metal doped on each surface of the electrode material 1 is equalized.

In the mode A, the counter electrode members 137, 143 that the upstream tank 131 of the doping tank 17 comprises are connected to one electrode of the power supply 109. The counter electrode members 139, 141 are connected to one electrode of the power supply 110. The counter electrode members 137, 143 that the downstream tank 133 of the doping tank 17 comprises are connected to the other electrode of the power supply 109. The counter electrode members 139, 141 are connected to the other electrode of the power supply 110.

Also, the counter electrode members 137, 143 that the upstream tank 131 of the doping tank 19 comprises are connected to one electrode of the power supply 111. The counter electrode members 139, 141 are connected to one electrode of the power supply 112. The counter electrode members 137, 143 that the downstream tank 133 of the doping tank 19 comprises are connected to the other electrode of the power supply 111. The counter electrode members 139, 141 are connected to the other electrode of the power supply 112.

Also, the counter electrode members 137, 143 that the upstream tank 131 of the doping tank 21 comprises are connected to one electrode of the power supply 113. The counter electrode members 139, 141 are connected to one electrode of the power supply 114. The counter electrode members 137, 143 that the downstream tank 133 of the doping tank 21 comprises are connected to the other electrode of the power supply 113. The counter electrode members 139, 141 are connected to the other electrode of the power supply 114.

In the conveyor roller group, the conveyor rollers 37, 41, 43, 47, 49, 53, 55, 59, 61, 65, 67, 71 are each made of an electrically conductive material. The remaining conveyor rollers in the conveyor roller group are each made of elastomer except for a bearing portion.

One terminal of the power supply 109 is connected to the conveyor rollers 37, 41, 43, 47. Also, the other terminal of the power supply 109 is connected to the counter electrode members 137, 143 that the upstream tank 131 and the downstream tank 133 of the doping tank 17 comprise. The electrode material 1 is in contact with the conveyor rollers 37, 41, 43, 47. The electrode material 1 and the counter electrode members 137, 143 are located in the dope solution that is the electrolyte solution. Thus, in the upstream tank 131 and the downstream tank 133 of the doping tank 17, the electrode material 1 and the counter electrode members 137, 143 are electrically connected through the electrolyte solution.

One terminal of the power supply 110 is connected to the conveyor rollers 37, 41, 43, 47. Also, the other terminal of the power supply 110 is connected to the counter electrode members 139, 141 that the upstream tank 131 and the downstream tank 133 of the doping tank 17 comprise. The electrode material 1 is in contact with the conveyor rollers 41, 47. The electrode material 1 and the counter electrode members 139, 141 are located in the dope solution that is the electrolyte solution. Thus, in the upstream tank 131 and the downstream tank 133 of the doping tank 17, the electrode material 1 and the counter electrode members 139, 141 are electrically connected through the electrolyte solution.

In the mode A, as described, the counter electrode members 137, 143 that are opposed to one surface of the electrode material 1 are connected to one terminal of the power supply 109, and the counter electrode members 139, 141 that are opposed to the other surface of the electrode material 1 are connected to one terminal of the power supply 110, thereby controlling an amount of alkali metal doped to a front surface of the electrode material 1 and an amount of alkali metal doped to a back surface of the electrode material 1 so as to be equal.

One terminal of the power supply 111 is connected to the conveyor rollers 49, 53, 55, 59. Also, the other terminal of the power supply 111 is connected to the counter electrode members 137, 143 that the upstream tank 131 and the downstream tank 133 of the doping tank 19 comprise. The electrode material 1 is in contact with the conveyor rollers 49, 53, 55, 59. The electrode material 1 and the counter electrode members 137, 143 are located in the dope solution that is the electrolyte solution. Thus, in the upstream tank 131 and the downstream tank 133 of the doping tank 19, the electrode material 1 and the counter electrode members 137, 143 are electrically connected through the electrolyte solution.

One terminal of the power supply 112 is connected to the conveyor rollers 49, 53, 55, 59. Also, the other terminal of the power supply 112 is connected to the counter electrode members 139, 141 that the upstream tank 131 and the downstream tank 133 of the doping tank 19 comprise. The electrode material 1 is in contact with the conveyor rollers 49, 53, 55, 59. The electrode material 1 and the counter electrode members 132, 141 are located in the dope solution that is the electrolyte solution. Thus, in the upstream tank 131 and the downstream tank 133 of the doping tank 19, the electrode material 1 and the counter electrode members 139, 141 are electrically connected through the electrolyte solution.

In the mode A, as described above, the counter electrode members 137, 143 that are opposed to one surface of the electrode material 1 are connected to one terminal of the power supply 111, and the counter electrode members 139, 141 that are opposed to the other surface of the electrode material 1 are connected to one terminal of the power supply 112, thereby controlling an amount of alkali metal doped to the front surface of the electrode material 1 and an amount of alkali metal doped to the back surface of the electrode material 1 so as to be equal.

One terminal of the power supply 113 is connected to the conveyor rollers 61, 65, 67, 71. Also, the other terminal of the power supply 113 is connected to the counter electrode members 137, 143 that the upstream tank 131 and the downstream tank 133 of the doping tank 21 comprise. The electrode material 1 is in contact with the conveyor rollers 61, 65, 67, 71. The electrode material 1 and the counter electrode members 137, 143 are located in the dope solution that is the electrolyte solution. Thus, in the upstream tank 131 and the downstream tank 133 of the doping tank 21, the electrode material 1 and the counter electrode members 137, 143 are electrically connected through the electrolyte solution.

One terminal of the power supply 114 is connected to the conveyor rollers 61, 65, 67, 71. Also, the other terminal of the power supply 114 is connected to the counter electrode members 139, 141 that the doping tank 21 comprises. The electrode material 1 is in contact with the conveyor rollers 61, 65, 67, 71. The electrode material 1 and the counter electrode members 139, 141 are located in the dope solution that is the electrolyte solution. Thus, in the doping tank 21, the electrode material 1 and the counter electrode members 139, 141 are electrically connected through the electrolyte solution.

In the mode A, as described above, the counter electrode members 137, 143 that are opposed to one surface of the electrode material 1 are connected to one terminal of the power supply 113, the counter electrode members 139, 141 opposed to the other surface of the electrode material 1 are connected to one terminal of the power supply 114, thereby controlling an amount of alkali metal doped to the front surface of the electrode material 1 and an amount of alkali metal doped to the back surface of the electrode material 1 so as to be equal.

(5) The electrode material 1 may have a shape other than the strip-shape. The electrode material 1 may have, for example, a rectangular shape or a circular shape.

(6) A function served by a single element in any of the above-described embodiments may be achieved by a plurality of elements, or a function served by a plurality of elements may be achieved by a single element. Also, a part of a configuration in any of the above-described embodiments may be omitted. Further, at least a part of a configuration in any of the above-described embodiments may be added to, or replace, another configuration of the embodiments.

(7) In addition to the electrode manufacturing system described above, the present disclosure may be implemented in various forms, such as an apparatus for manufacturing an electrode material and a method for manufacturing an electrode material.

The invention claimed is:

1. An electrode manufacturing method comprising:
cutting an electrode material along one direction of the electrode material to manufacture at least one electrode,
wherein the electrode material has a strip shape and comprises a current collector and active material layers,
wherein the current collector has a strip shape,
wherein the active material layers are formed on both surfaces of the current collector,
wherein the electrode material comprises:
first sections including an active material doped with alkali metal, the first sections extending in the one direction; and
a second section arranged between two adjacent first sections of the first sections, the second section including a portion where the active material is absent and a portion where an active material not doped with alkali metal exists, and
wherein cutting the electrode material along one direction of the electrode material to manufacture electrodes comprises cutting the second section.

2. The method according to claim 1,
wherein the one direction is a longitudinal direction of the electrode material.

3. The method according to claim 1,
wherein the electrode material is manufactured using an electrode material manufacturing apparatus,
wherein the second section of the electrode material manufactured using the electrode material manufacturing apparatus is cut, and
wherein the electrode material manufacturing apparatus comprises:
   a doping tank storing a solution including alkali metal ions:
   a conveyer unit configured to convey the electrode material along a path passing through the doping tank, the electrode material being in a state where the active material included in the first section is not doped with the alkali metal; and
   a counter electrode member stored in the doping tank.

4. The method according to claim 3,
wherein the electrode material manufacturing apparatus further comprises a mask covering the second section, the mask arranged between the electrode material and the counter electrode member in the doping tank.

5. An electrode manufacturing system comprising: a cutting device comprising a slitter configured to manufacture at least one electrode by cutting an electrode material along one direction of an electrode material,
   wherein the electrode material has a strip shape and comprises a current collector and active material layers,
   wherein the current collector has a strip shape,
   wherein the active material layers are formed on both surfaces of the current collector,
   wherein the electrode material comprises:
      first sections including an active material doped with alkali metal, the first sections extending in the one direction; and
      a second section arranged between two adjacent first sections of the first sections, the second section including a portion where the active material is absent and a portion where an active material not doped with alkali metal exists, and
   wherein the cutting device is configured to cut the second section.

6. The system according to claim 5,
wherein the one direction is a longitudinal direction of the electrode material.

7. The system according to claim 5,
wherein the system further comprises an electrode material manufacturing apparatus, and
wherein the electrode material manufacturing apparatus comprises:
   a doping tank storing a solution including alkali metal ions:
   a conveyer unit configured to convey the electrode material along a path passing through the doping tank, the electrode material being in a state where the active material included in the first section is not doped with the alkali metal; and
   a counter electrode member stored in the doping tank.

8. The system according to claim 7,
wherein the electrode material manufacturing apparatus further comprises a mask covering the second section, the mask arranged between the electrode material and the counter electrode member in the doping tank.

* * * * *